(12) United States Patent
Aifer et al.

(10) Patent No.: US 11,085,830 B2
(45) Date of Patent: Aug. 10, 2021

(54) HIGH SPEED GRAPHENE OXIDE BOLOMETERS AND METHODS FOR MANUFACTURING THE SAME

(71) Applicant: The Government of the United States, as represented by the Secretary of the Navy, Washington, DC (US)

(72) Inventors: Edward Aifer, Arlington, VA (US); Erin Cleveland, College Park, MD (US); Glenn Jernigan, Waldorf, MD (US); Jill Nolde, Washington, DC (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/800,572

(22) Filed: Feb. 25, 2020

(65) Prior Publication Data
US 2020/0191659 A1 Jun. 18, 2020

Related U.S. Application Data

(63) Continuation of application No. PCT/US2018/048123, filed on Aug. 27, 2018.

(60) Provisional application No. 62/549,993, filed on Aug. 25, 2017.

(51) Int. Cl.
| G01J 5/20 | (2006.01) |
| G01J 5/02 | (2006.01) |
| G01J 5/04 | (2006.01) |
| G01J 5/08 | (2006.01) |

(52) U.S. Cl.
CPC ............ *G01J 5/20* (2013.01); *G01J 5/023* (2013.01); *G01J 5/024* (2013.01); *G01J 5/0235* (2013.01); *G01J 5/046* (2013.01); *G01J 5/0853* (2013.01)

(58) Field of Classification Search
CPC .. G01J 5/20; G01J 5/024; G01J 5/0853; G01J 5/023; G01J 5/0235; G01J 5/046
USPC .................................................... 250/338.1
See application file for complete search history.

(56) References Cited

U.S. PATENT DOCUMENTS

| 7,723,684 | B1 | 5/2010 | Haddon et al. |
| 9,196,766 | B1* | 11/2015 | Egerton ............... H01L 31/101 |
| 9,851,257 | B1* | 12/2017 | Sood ..................... G01J 5/023 |
| 10,297,700 | B1* | 5/2019 | Egerton ................ H01L 31/08 |
| 2008/0135758 | A1* | 6/2008 | Yang ....................... G01J 5/20 |
| | | | 250/338.1 |
| 2008/0135949 | A1* | 6/2008 | Lo ......................... B82Y 10/00 |
| | | | 257/401 |

(Continued)

OTHER PUBLICATIONS

D. Lohrmann, R Littleton, C. Reese, D. Murphy, and J. Vizgaitis, "Uncooled long-wave infrared small pixel focal plane array and system challenges". Optical Engineering 52(6), 061305 (2013).

(Continued)

*Primary Examiner* — Mark R Gaworecki
(74) *Attorney, Agent, or Firm* — US Naval Research Laboratory

(57) ABSTRACT

Bolometers and methods of forming the same are provided. A bolometer that includes a substrate, a support structure comprising at least one SiGe layer and at least one Si layer, an absorber comprising reduced graphene oxide, and a thermistor comprising partially reduced graphene oxide are described. Also described are methods for forming bolometers and the parts contained therein.

20 Claims, 21 Drawing Sheets

(56) References Cited

U.S. PATENT DOCUMENTS

| | | | |
|---|---|---|---|
| 2008/0150075 A1* | 6/2008 | Chang | H01L 27/1203 257/506 |
| 2009/0140148 A1* | 6/2009 | Yang | G01J 5/20 250/338.4 |
| 2011/0227040 A1* | 9/2011 | Iwaki | G01K 7/226 257/14 |
| 2012/0003438 A1* | 1/2012 | Appleton | H01L 29/16 428/195.1 |
| 2013/0161515 A1 | 6/2013 | Park et al. | |
| 2013/0240738 A1* | 9/2013 | Yon | G01J 5/0285 250/349 |
| 2014/0151557 A1* | 6/2014 | Lambkin | H01L 31/18 250/338.1 |
| 2014/0217289 A1 | 8/2014 | Nam et al. | |
| 2014/0353506 A1* | 12/2014 | Nam | G01J 3/36 250/349 |
| 2016/0097681 A1* | 4/2016 | Buchan | G01J 5/045 250/338.4 |
| 2016/0178444 A1 | 6/2016 | Oulachgar et al. | |
| 2020/0292489 A1* | 9/2020 | Haque | G01N 27/4145 |

OTHER PUBLICATIONS

M. N. Luckyanova, J. Garg, K. Esfarjani, A. Jandl, M. T. Bulsara, A. J. Schmidt, A. J. Minnich, S. Chen, M. 8. Dresselhaus, Z. Ren, E. A. Fitzgerald, G. Chen, "Coherent Phonon Heat Conduction in Superlattices", Science 338, 936 (2012).

Zhiting Tian, Keivan Esfarjani, and Gang Chen, "Green's function studies of phonon transport across Si/Ge superlattices", Phys. Rev B 89, 235307 (2014).

D. Li, Y. Wu, R. Fan, and P. Vang, "Thermal conductivity of Si/SiGe superlattice nanowires", Appl. Phys. Lett. 83, 3186 (2003).

R. Cheaito, J. C. Douda, T. E. Beechem, K. Hattar, J. F. Ihlefeld, D. L. Medlin, M. A. Rodriguez, M. J. Campion, E. S. Piekos, and P. E. Hopkins, "Experimental Investigation of Size Effects on the Thermal Conductivity of Silicon-Germanium Alloy Films", Phys. Rev. Lett. 109,195901 (2012).

M.V. Simkin and G. D. Mahan, "Minimum Thermal Conductivity of Superlattices", Phys. Rev. Letts. 34, 927 (2000).

Jivtesh Garg and Gang Chen, "Minimum thermal conductivity in superlattices: a first-principles formalism", Phys. Rev B 87,140302 (2013).

A. L. Davidson III, M. Twigg, P. Thompson, T. Worchesky, and E. Aifer, "Thermal diffusivity and heat opacity of SiGe/Si superlattice from 374 K to 674 K", Appl. Phys. Letts. 107,143503 (2015).

R. Sultan, A. D. Avery, G. Stiehl, and B. L. Zink, "Thermal conductivity of micromachined low-stress silicon-nitride beams from 77 to 325 K", J. Appl. Phys. 105, 043501 (2009).

N. Geyer, Z. Huang, B. Fuhrmann, S. Grimm, M. Reiche, T. Nguyen-Due, J. de Boor, H. S. Leipner, P. Werner, and U. Gosele, "Sub-20 nm Si/Ge superlattice Nanowires by Metal assisted Etching", Nano Letts., 9, 3106 (2009).

\* cited by examiner

HIGH SPEED GRAPHENE OXIDE BOLOMETERS AND METHODS FOR MANUFACTURING THE SAME

BACKGROUND

Field of the Invention

The present application relates generally to bolometers and methods for manufacturing the same.

Description of Related Art

A bolometer is a device that measures the power of incident electromagnetic radiation by measuring how much heat is generated in a material with a temperature dependent resistance. FIG. 1 is a schematic illustration of the basic components in one type of conventional bolometer. A photon 102 is absorbed by an absorber 104 having a low thermal mass. Absorber 104 is in thermal contact with film 106. Film 106 has much smaller thermal mass than absorber 104. Together absorber 104 and film 106 form a bolometer bridge assembly 107. Assembly 107 is mechanically supported by thermally isolating but electrically conductive legs 108A and 108B. Legs 108A and 108B contact terminals 109A and 109B on an electronic read-out integrated circuit (ROIC) 110.

The energy of photon 102 ($E_{ph}$) absorbed by absorber 104 is converted into heat causing a slight increase in the temperature of assembly 107. Film 106 is constructed from a material whose electrical resistance varies with temperature in a known manner. Thus, the change in resistance of film 106 will correspond to the change in temperature of assembly 107, which in turn corresponds to the energy of photon 102. Legs 108A and B are arranged to have low and unchanging electrical resistance relative to that of film 106 over the likely temperature range of operation. A small bias current, calibrated to contribute negligible self-heating of the assembly 107 through resistive losses, is imposed across film 106 by the ROIC 110. Under these conditions, the resistance (R) of film 106 may be monitored from the ratio of the voltage difference between terminals 109A and B ($V_{meas}$), to the imposed bias current ($i_b$), $$R = \frac{V_{meas}}{i_b},$$

and may be directly related to the photon flux 102 into the absorber 104.

Infrared (IR) bolometers function in a similar manner as the bolometer shown in FIG. 1. IR bolometers detect a change in a temperature dependent electronic property as photons are absorbed. Typically, the temperature dependent property is the resistance (R) of a thermistor. A thermistor may be a thin film which has a large temperature coefficient of resistance $$TCR = \frac{1}{R}\frac{dR}{dT}.$$

In some IR bolometers, a bias current $i_b$ is supplied by a readout integrated circuit (ROIC), and the signal output from the bolometer is proportional to $i_b$·R·TCR·ΔT, where ΔT is the photon induced change in temperature. As a person of ordinary skill will recognize, however, resistive bolometers require strong absorption of incoming photons, extremely low thermal mass or heat capacity of the absorber assembly 107, and high thermal isolation of this assembly.

To achieve strong absorption of incoming photons, conventional bolometers employ a bridge structure design in which a thin metallic film is suspended λ/4 microns above a mirror to form an optical cavity with a resonant absorption peak centered on λ. When the suspended metal film has an impedance near that of free space (377Ω), nearly 100% absorption of incident IR radiation can be absorbed. To match the impedance of free space with that of the suspended metal film, the suspended metal film is typically formed using a 10-50 nm thick film of NiCr. The bridge also includes a thermistor typically provided by a 100 nm layer of Vanadium Oxide (VOx) or amorphous silicon (a-Si) that is electrically isolated from the NiCr absorber by a thin dielectric.

These layers are deposited on top of a 400-500 nm thick layer of Silicon Nitride ($SiN_x$) for mechanical support and use serpentine legs extending laterally from opposite corners to attach the bridge to the ROIC. The $SiN_x$ legs are typically 25-50 microns long and under 1 μm$^2$ in cross-sectional area.

However, there are several drawbacks to this conventional IR bolometer design. First, the design limits the speed and spatial resolution of the bolometer. The speed of a bolometer, (i.e., the time it takes to register a change in photon flux), is determined by its thermal time constant (TTC) which is equal to C/G, where C(J/K) is the heat capacity of the bridge, and G(W/K) is the total thermal conductance from the bridge to its environment. To minimize noise, it is essential to achieve a value of G near the radiant transfer limit (G~10 nW/K), motivating the use of the serpentine leg structures described above. As a result of the combined thermal mass of the VOx or a-Si thermistor, and NiCr and SiNx absorber and support structure, the heat capacity of the bridge is still significant relative to the small value of G, so that the thermal time constant is typically 10 ms or longer. Moreover, using lateral serpentine leg structures typically requires sacrificing area in the pixel that might otherwise be used to collect photons, reducing the optical fill-factor. For a given G, the fill-factor decreases with pixel size, making thermal imaging arrays with pixel-pitch much less than 17 microns very difficult to manufacture, so that bolometers typically offer only modest spatial resolution by today's IR imaging standards. Therefore, it would be beneficial to develop a bolometer that improves upon the current designs.

SUMMARY OF THE INVENTION

One or more the above limitations may be diminished by structures and methods described herein.

In one embodiment, a bolometer and method of forming the same are provided. The bolometer includes a substrate, a support structure comprising at least one SiGe layer and at least one Si layer, an absorber comprising reduced graphene oxide, and a thermistor comprising partially reduced graphene oxide.

In another embodiment, a method of forming a bolometer is provided. A plurality of SiGe layers and Si layers are formed on a substrate that includes a mirror. The plurality of SiGe layers and Si layers are alternately arranged. The plurality of SiGe layers and Si layers are etched to form a plurality of support structures. A sacrificial layer is formed around the plurality of support structures such that a surface of the sacrificial layer and at least one surface of each support structure lie approximately in the same plane. A bolometer bridge that includes a thermistor comprising partially reduced graphene oxide, an absorber comprising reduced graphene oxide, and an isolation layer is provided on the surface of the sacrificial layer and the at least one surfaces of the support structures. The sacrificial layer is removed such that the bolometer bridge is supported by the support structures.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Figure 1:
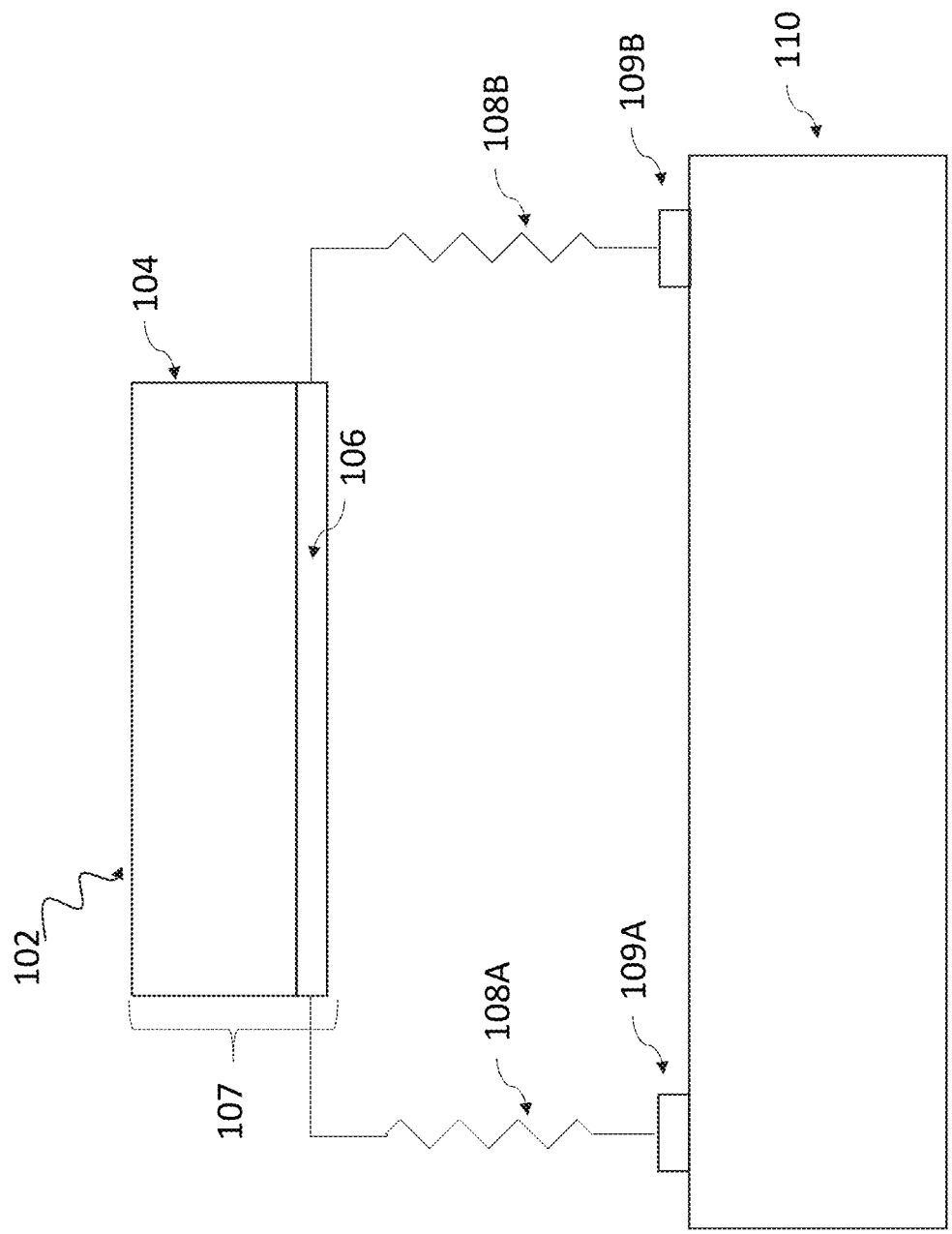
FIG. 1 is a cross-sectional view of a conventional bolometer.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are bolometers and methods for forming the same.

Figure 2A:
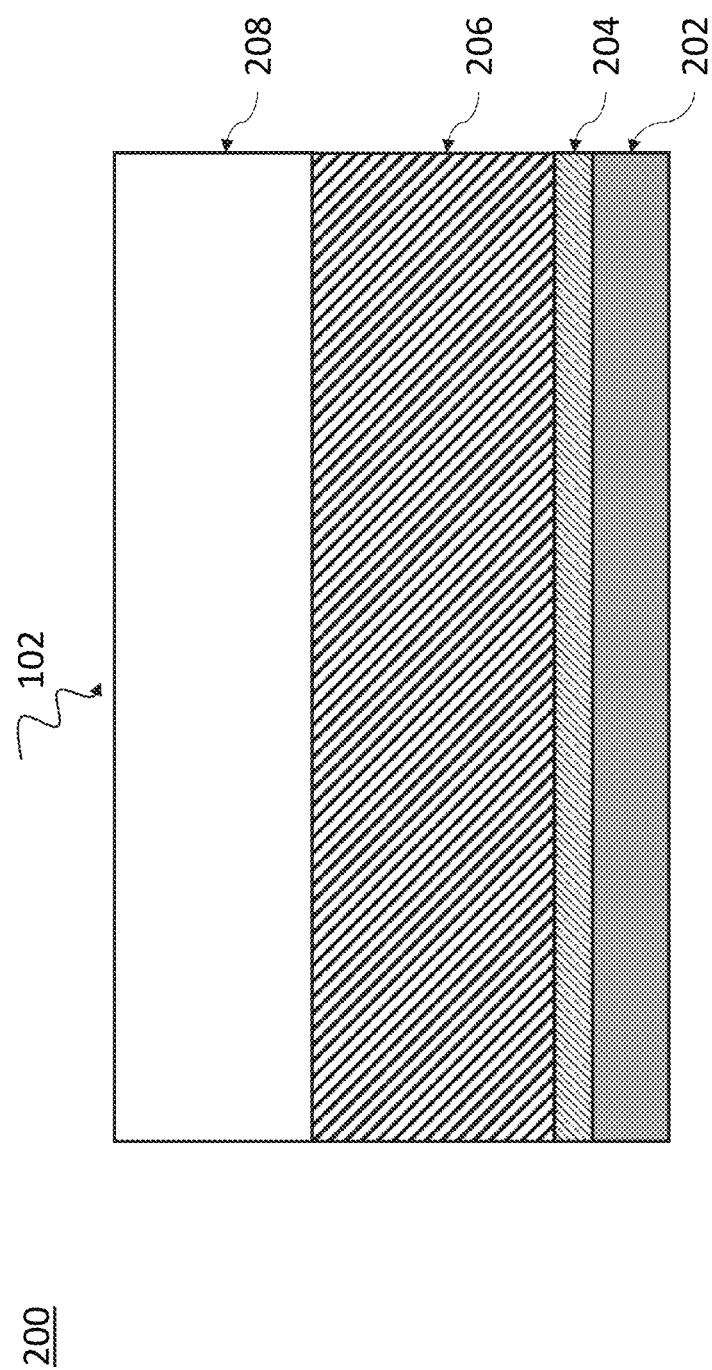
FIG. 2A is a cross-sectional view of a bolometer according to one embodiment.

FIG. 2A is a cross-sectional view of an infrared (IR) bolometer 200, according to one embodiment. Notably, a substrate 202, a mirror 204, a supporting structure 206, and a bolometer bridge 208 are provided. Mirror 204 is disposed on substrate 202, which may be formed from a semiconductor such as silicon. Mirror 204 is constructed to reflect radiation in the infrared region and may be formed, in a preferred embodiment, by titanium and palladium or any other metal with high reflectance in the infrared region. Next, a spacer, such as $SiO_2$, is provided to form an optical cavity 206. In another embodiment, a plurality of structures could be used instead to form the optical cavity. For example, in FIG. 2B, two supporting structures 206A and 206B are provided to create an air-gap optical cavity 206. Above the optical cavity 206 is the bolometer bridge 208. Bolometer bridge 208 may be formed from a plurality of elements including: an absorber 210, an isolation layer 212, and a thermistor 214, as illustrated in FIG. 2C. In one embodiment, absorber 210 comprises reduced graphene oxide (RGO) and the thermistor 214 comprises partially reduced graphene oxide (PRGO). As discussed below, the mechanical, thermal, and electrical properties of graphene oxide make this material well suited for use in absorber 210 and thermistor 214 and helps to eliminate the need for serpentine legs. Attention will now be turned to FIG. 2D which illustrates the steps of preparing reduced or partially reduced graphene oxide films that are suitable for use in absorber 210 and thermistor 214, respectively.

Graphene oxide may be obtained commercially in powdered form (e.g., ACS part # GNO1P005). Commercially available graphene oxide powder typically has a 30-40% oxygen/carbon composition by weight. This concentration of oxygen is too high for use in absorber 210 and thermistor 214. Thus, a series of steps are performed to reduce the oxygen content to acceptable levels. First, the graphene oxide power is dissolved in a solution in S201. This may be accomplished by dissolving 50 mg of the graphene oxide power in 25 mls of water and sonicating the solution for 2 hours. Ethanol is also added to the solution in order to obtain 0.5 mg of graphene oxide power per 1 ml of solution (0.5 mg/mL). Diluting the solution with ethanol is necessary to obtain solvent evaporation during the spin cast process. Next, in S203, the solution is placed in a centrifuge to remove any undissolved solids. Then, in S205, the solution is drop-cast onto a substrate.

The graphene oxide film may be formed on a variety of substrates including, for example, hydrophilic sapphire, Si, or $SiO_2$. However, it is first necessary to clean the substrate prior to drop-casting. This may be done for sapphire substrates using an SC1 cleaning process (10 mins in 80° $NH_4OH:H_2O_2:H_2O$) or a piranha etch (10 mins $H_2SO_4$: $H_2O_2$), followed by a low energy oxygen plasmas exposure for 5-10 mins. The SC1 clean is also effective in cases where Si or $SiO_2$ is used for the substrate. In a preferred embodiment, the solution is drop-cast onto the substrate in a volume sufficient to coat the entire surface while the substrate is spinning at a predetermined rate of rotation (preferably 3000 rpm), and with $N_2$ gas flowing over the substrate. This technique will create an average of one monolayer of graphene oxide per 4 aliquots of solution, with 1 aliquot being the volume of solution necessary to cover the surface (e.g., 50 microliters for a 10 mm×10 mm substrate).

Next, in S207, the films are deoxygenated in a high vacuum (HV) system with a base pressure less than or equal to $1 \times 10^{-5}$ Torr and brought up to a specified temperature at a rate of 1° C./sec where they are annealed for 10 minutes. Deoxygenating the films in high vacuum causes some or all of the oxide groups to desorb from the film. The amount of desorption depends upon the relationship between the decomposition temperature and the anneal temperature. If the anneal temperature is equal to or greater than the decomposition temperature, then the film may be fully reduced. If the anneal temperature is equal to or lower than the decomposition temperature, then the film may be only partially reduced. Thus, by controlling the anneal temperature the amount of oxide desorption can be controlled.

As noted above, thermistor 214 comprises a partially reduced graphene oxide film (PRGO). The PRGO film may be formed by HV annealing a 10-15 nm-thick GO film (formed as described above) at an annealing temperature of 200-350° C. The resulting PRGO film has a sheet resistance of 1-100 M-Ω per-square, which provides sufficiently low self-heating power losses to enable thermistor 214 to undergo simple dc biased operation, making thermistor 214 compatible with existing ROICs developed for high impedance a-Si bolometers. Also as noted above, absorber 210 comprises a fully reduced graphene oxide film (RGO). The RGO film for absorber 210 may be formed by HV annealing a 50 nm thick GO film up to 800° C. The GO films can be removed from their substrates by using dilute hydrofluoric acid.

Figure 3A:
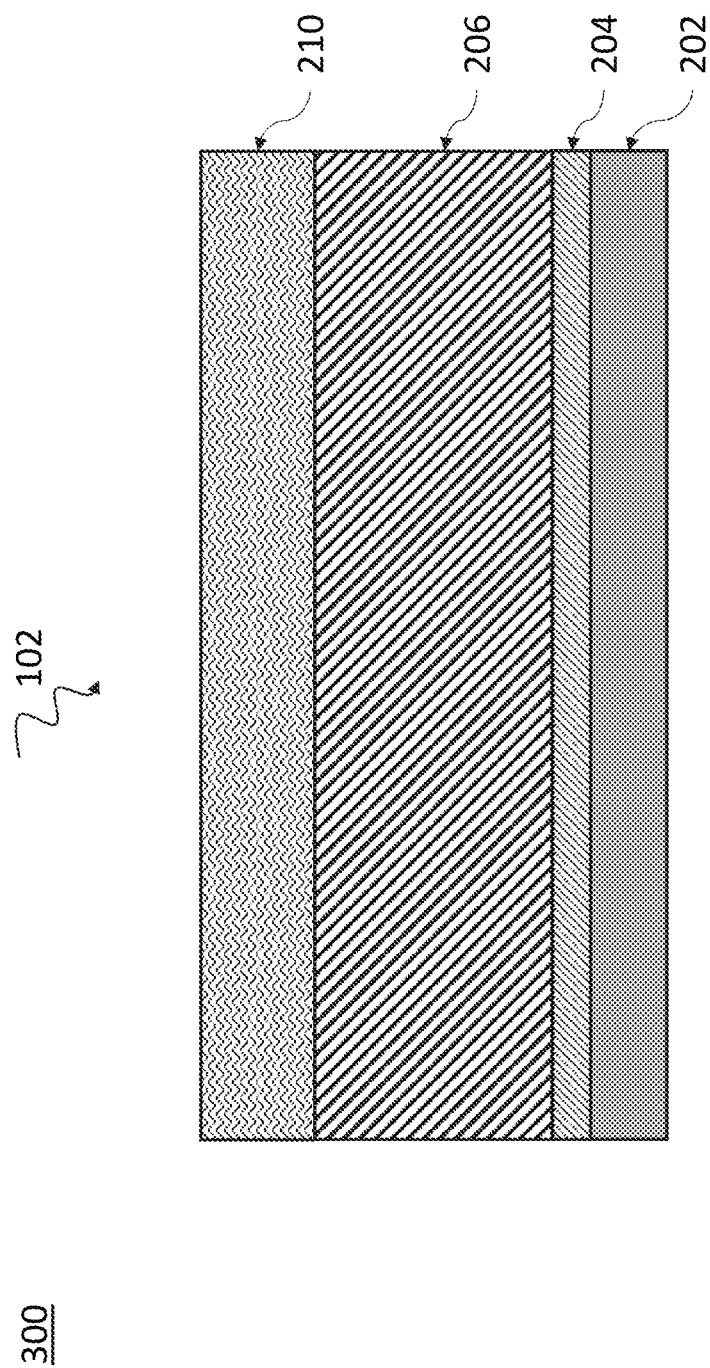
FIG. 3A is a cross-sectional view of an infrared absorber.
Figure 3B:
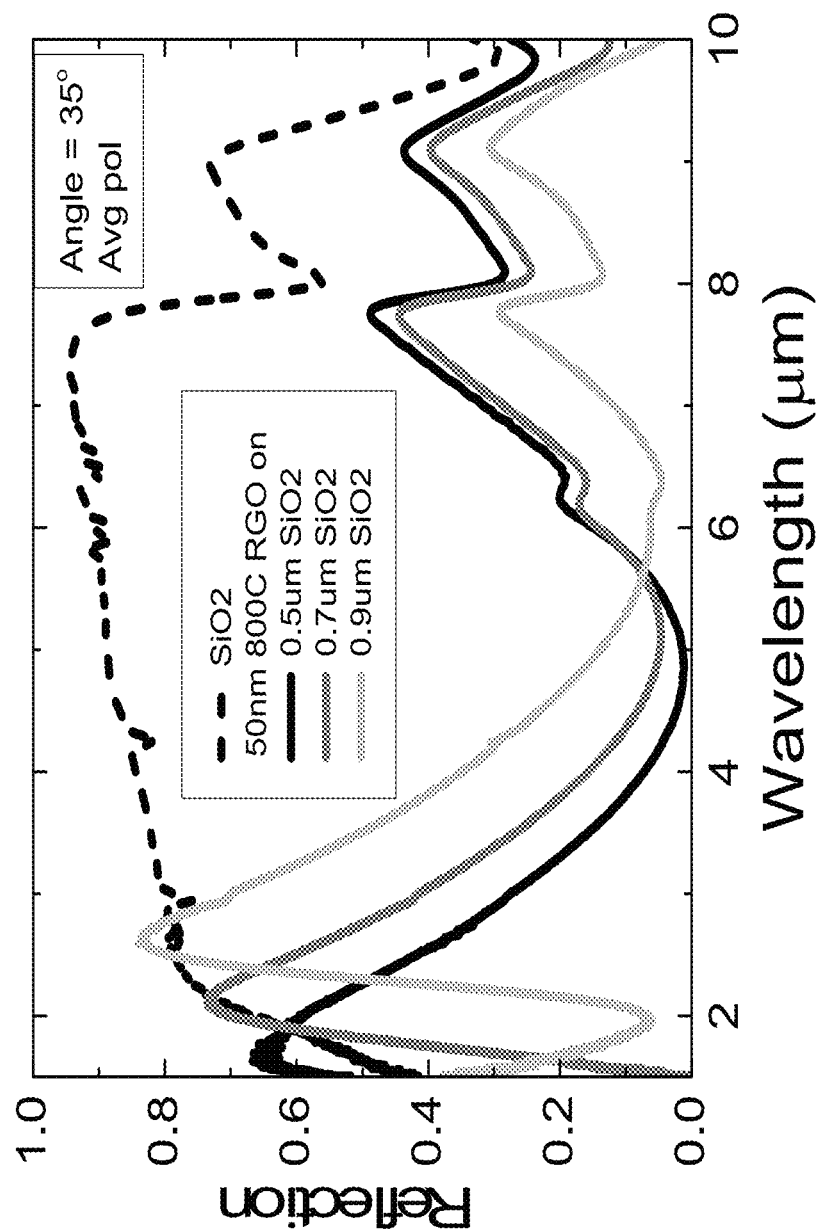
FIG. 3B is a graph of reflectance versus wavelength for the infrared absorber shown in FIG. 3A.

FIG. 3A shows an absorber structure 300 that includes an absorber 210 comprising an RGO film formed by the techniques described above. FIG. 3B is a plot of IR reflection versus wavelength (in microns) at an angle of 35° for absorber structures of the form of structure 300 with silicon oxynitride ($SiO_xN_y$) spacers (forming cavity 206) of 0.5, 0.7, and 0.9 micron thicknesses deposited by plasma enhanced chemical vapor deposition (PECVD). As shown in FIG. 3B, an $SiO_xN_y$ spacer of 0.5 microns with refractive index≈1.8, results in nearly 100% absorbance of IR radiation at 5 microns. For normal incidence, the resonant wavelength would be slightly shorter.

Figure 4A:
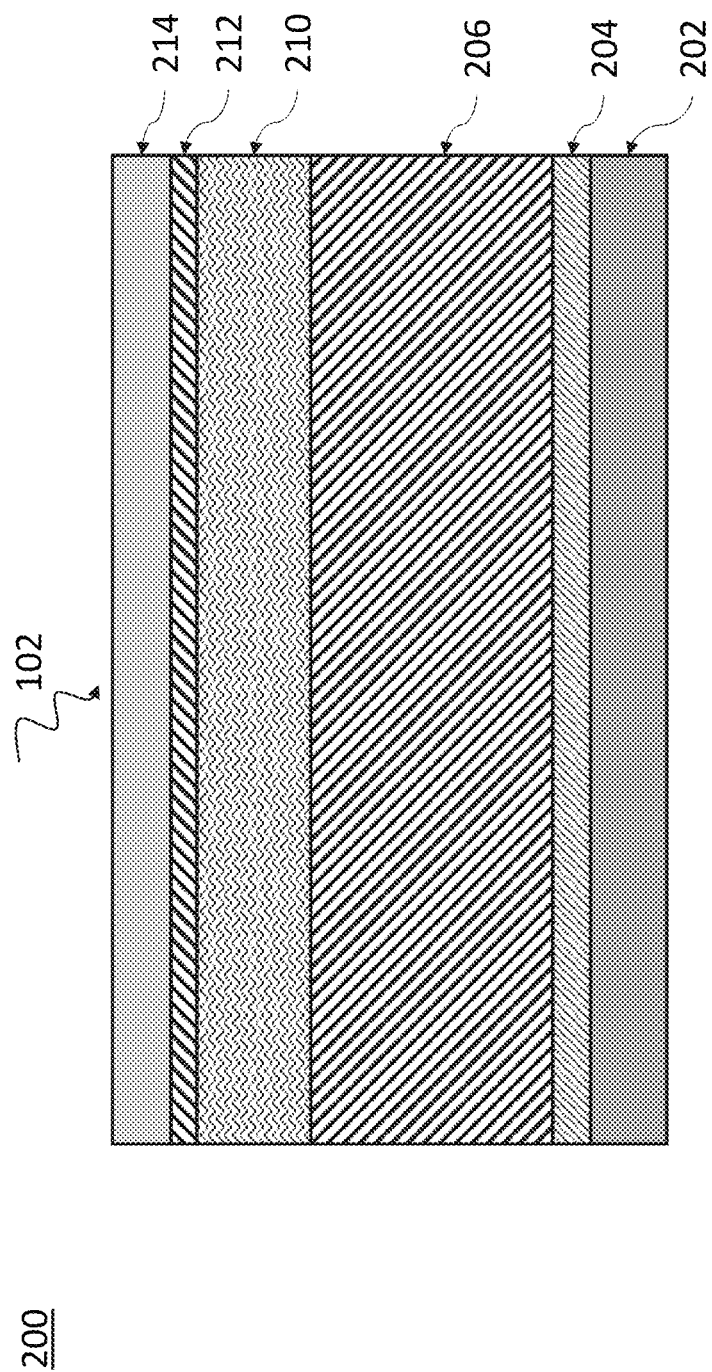
FIG. 4A is a cross-sectional view of a bolometer according to one embodiment.

Having described PRGO and RGO films for use in thermistor 214 and absorber 210, respectively, attention is now directed to FIG. 4A. FIG. 4A is substantially similar to FIG. 2A, except the details of the bolometer bridge 208 are shown. Thus, elements 202, 204, 206, and 210 are the same as described above in FIG. 2C. Disposed on RGO absorber 210 is isolation layer 212 which may be formed, in a preferred embodiment, by atomic layer deposition of a 10 nm-thick layer of $Al_2O_3$ which is sufficient to provide electrical isolation while allowing high thermal conduction between the PRGO thermistor 214 and the RGO absorber 210. The thin layer of $Al_2O_3$ provides also negligible increase in heat capacity. When the $Al_2O_3$ layer is in place, it may act as a substrate onto which the PRGO film may be spin coated by the techniques described above (HV annealing between 200 and 500° C. to optimize the temperature coefficient of resistance (TCR)). The resulting bolometer bridge 208 therefore includes, in a preferred embodiment, a 10 nm-thick PRGO thermistor 214, a 10 nm-thick $Al_2O_3$ isolation layer 212, and a 50 nm-thick RGO absorber 210. Thus, the total thickness of the bolometer bridge, in a preferred embodiment, is approximately 70 nm. Of course, one of ordinary skill would recognize that these thicknesses may be varied within certain ranges in accordance with certain trade-offs. For example, where bolometer speed is favored over responsivity, an ultra-thin bridge 208 may be utilized having only a 20-30 nm thick RGO absorber 210 to reduce thermal mass at the expense of optical absorption. Or, for lower self-heating, more highly resistive thermistors may be made using PRGO films 214 of 5 nm or less in thickness. The bridge assembly may also be reduced in thickness without change in absorption or resistance with the use of thinner electrical isolation layers 212 such as the use of hafnium gate dielectrics as thin as 2 nm. It may also be of use to increase the thickness of the absorber 210 to increase absorption in longer wavelength bands in the far infrared or Terahertz. Since few limitations are placed on the PRGO thermistor and RGO absorber film thickness by the spin deposition and vacuum annealing procedures, one is free to optimize the bolometer structure for wide range of applications.

Through the techniques described above, a bolometer bridge 208 may be constructed with an overall thickness of under 100 nm. Moreover, one of the advantages of the PRGO and RGO films that comprises the thermistor 214 and absorber 210, respectively, is their mechanical strength. Even at respective thicknesses of 10 nm and 50 nm, the PRGO and RGO films are self-supporting, obviating the need for the 500 nm-thick $SiN_x$ backbone layer that is typically required in conventional bolometers to support the bolometer bridge. As a result, the serpentine leg structures found in conventional bolometers may be replaced by vertical pillars of suitably high thermal resistance and electrical conductance. One of the advantages of bolometer bridge 208 over a conventional bolometer with a backbone layer is that the five factor reduction in thickness is commensurate with a five factor reduction in heat capacity. In turn, this reduction in heat capacity translates to a five factor increase in the speed of the uncooled bolometer 200, compared to a conventional bolometer with a backbone layer.

Figure 2B:
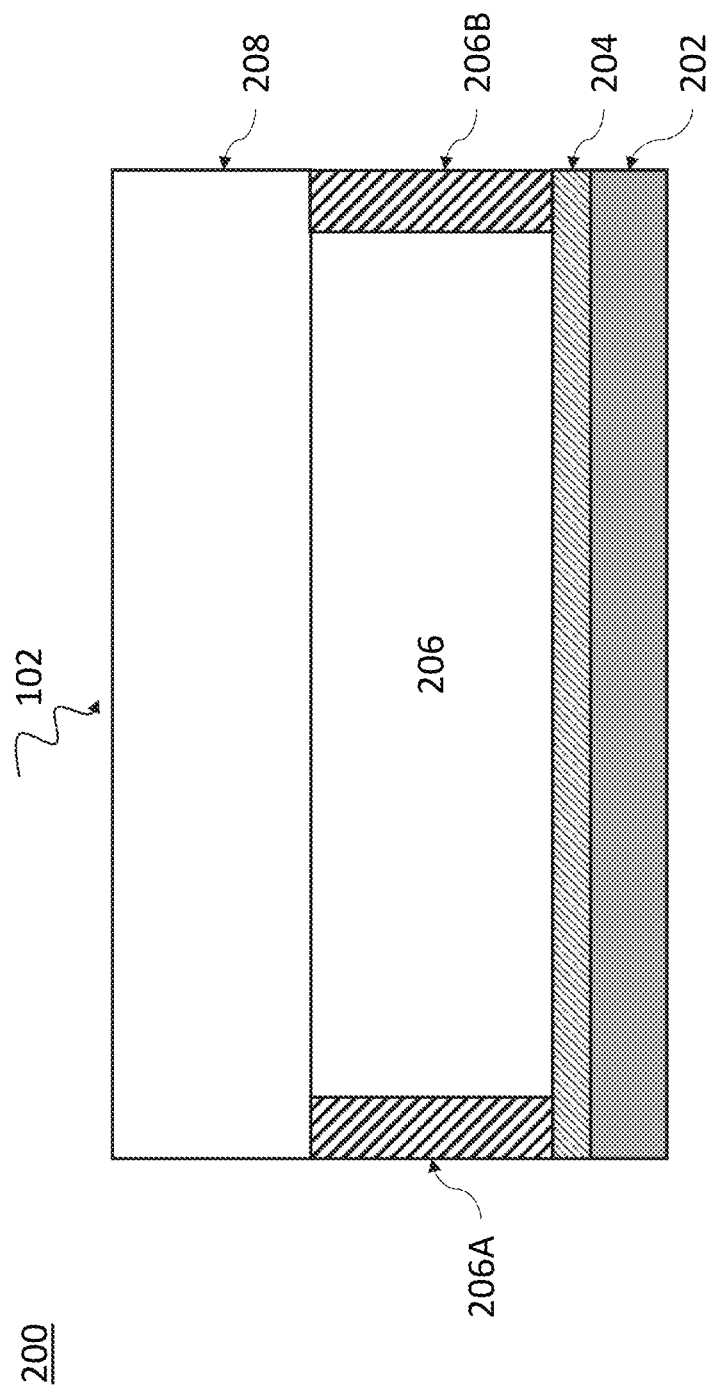
FIG. 2B is a cross-sectional view of a bolometer according to another embodiment.
Figure 2C:
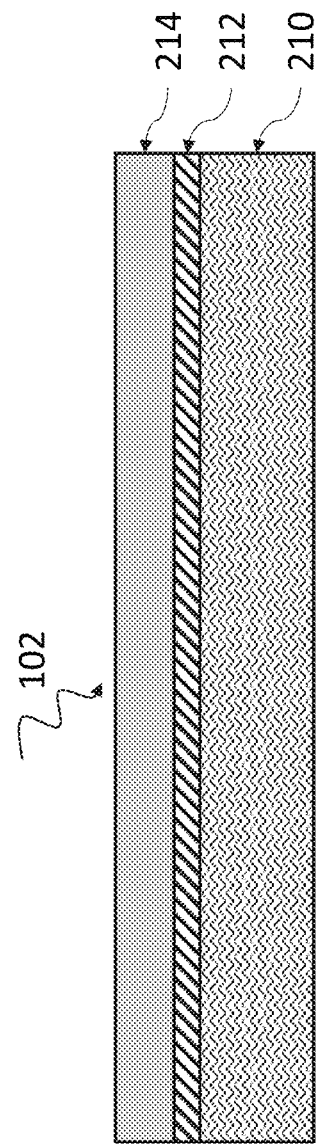
FIG. 2C is a cross-sectional view of a bolometer bridge according to one embodiment.
Figure 2D:
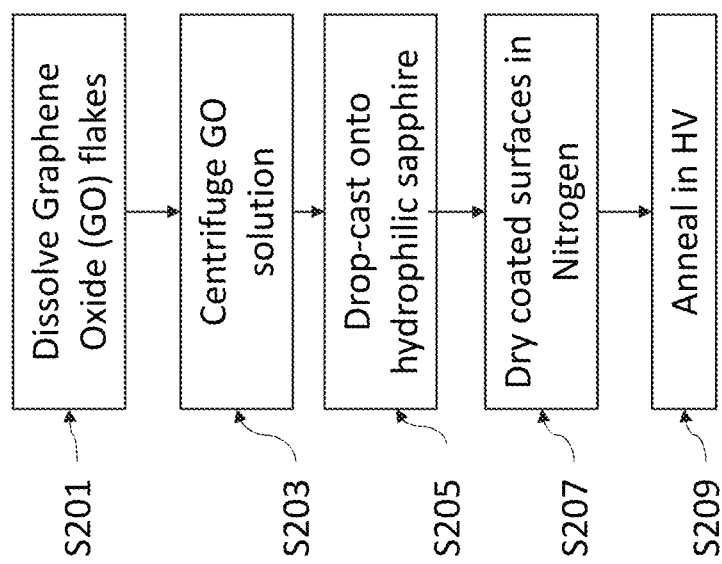
FIG. 2D is a flow chart illustrating the steps in a method of forming graphene oxide films.
Figure 4B:
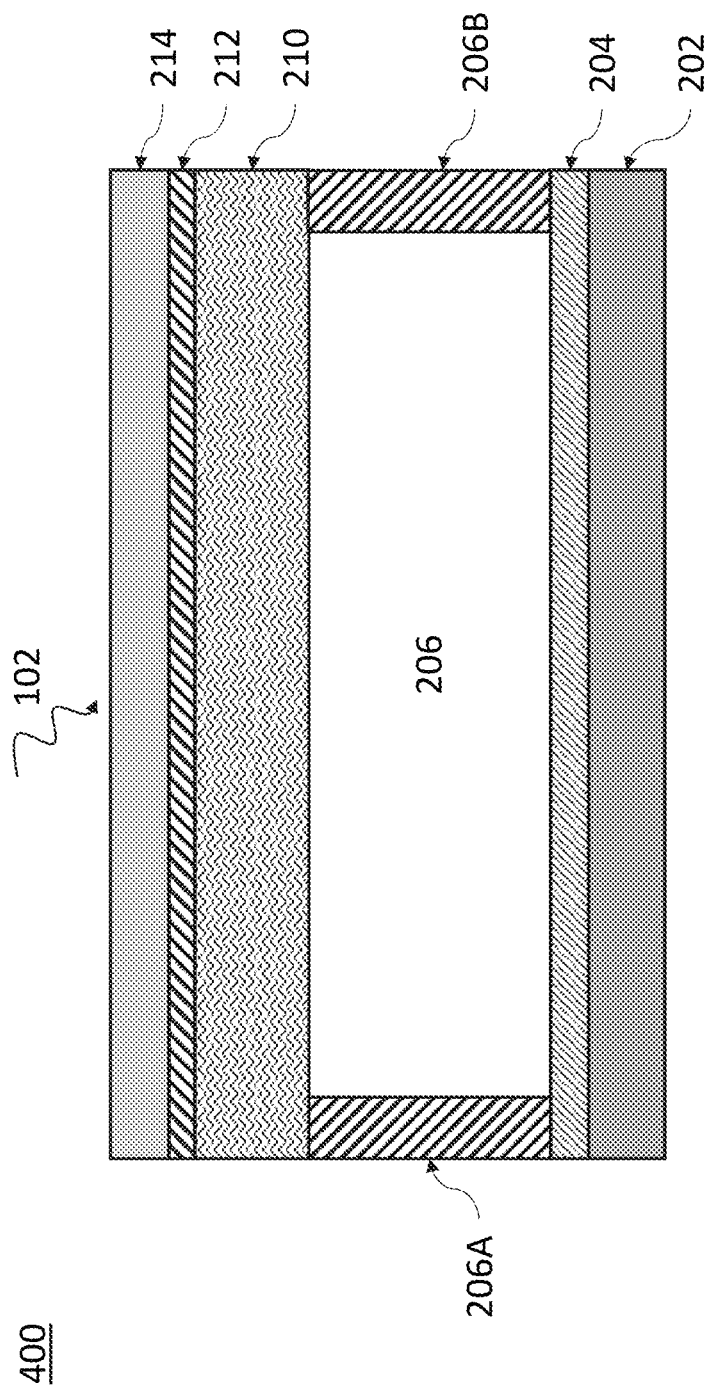
FIG. 4B is a cross-sectional view of a bolometer according to another embodiment.

While FIG. 4A illustrates a bolometer 200 that is constructed using a contiguous spacer to form optical cavity 206, in another embodiment support structures 206A and 206B (as shown in FIG. 2B) may alternatively be used to produce an optical cavity 206, as illustrated in FIG. 4B. FIG. 4B is a cross-sectional view of a bolometer 400 which is substantially similar to bolometer 200 except the spacer has been replaced by support structures 206A and 206B. As described above, the mechanical strength of the PRGO and RGO films allow the thermistor 214 and absorber 210 to be self-supporting. Therefore, it is not necessary to have an underlying support structure such as a solid spacer or thick backbone to support the bolometer bridge 208. In a preferred embodiment, support structures 206A and 206B provide for thermal isolation between the bolometer bridge 208 and the mirror 204 and substrate 202, while being electrically conductive. Support structures 206A and 206B may be implemented by using an alternating arrangement of different material layers, as described below in reference to FIG. 5.

Figure 5:
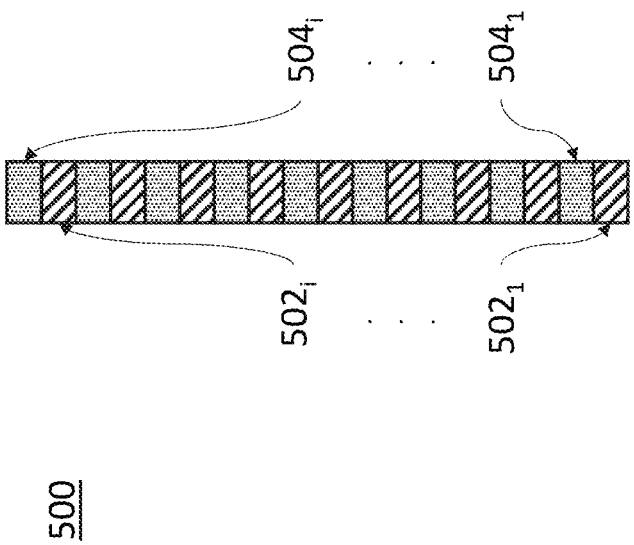
FIG. 5 is a cross-sectional view of a support structure.

FIG. 5 illustrates and exemplary support structure 500 that may be used as support structure 206A or 206B. Support structure 500 comprises alternating layers of a first material $502_1 \ldots 502_i$ (in general 502) and a second material $504_1 \ldots 504_i$ (in general 504). The first and second materials provide thermal isolation between the bolometer bridge 208 and the substrate 202 while simultaneously providing an electrical connection. In a preferred embodiment, the first material 502 may be SiGe and the second material 504 may be Si. While in FIG. 5, the first material 502 is on the bottom and the second material 504 is on the top, that configuration is merely exemplary. Either the first material 502 or the second material 504 may be at the bottom or top of the structure. The SiGe material 502 may be within a range from $Si_{80\%}Ge_{20\%}$ to $Si_{90\%}Ge_{10\%}$, inclusive. The SiGe/Si support structure 500 may be grown such that each SiGe material layer 502 and each Si material layer 504 have the same thicknesses, in the range of 4-20 nm. The overall thickness of the SiGe/Si support structure 500 is typically arranged to implement a λ/4 air-gap cavity structure for the long-wave infrared band centered at 10 microns in wavelength or about 2.5 micron in thickness, but may be of any thickness practical for realization of such structures, to accommodate other wavelength bands. The SiGe/Si support structure 500 may be grown by molecular beam epitaxy on, for example, an Si substrate at a temperature range of 100-500° C. The higher end of that temperature range tends to promote the formation of crystalline material, whereas the lower end of that temperature range tends to promote the growth of polycrystalline material. In either case, both types of materials are suitable. To make the SiGe/Si support structure 500 electrically conductive, layers 502 and 504 may be doped with a doping agent to produce an n-doping level in the range of $1.0 \times 10^{-18}$-$1.0 \times 10^{-20}$ cm$^{-3}$, inclusive. In one embodiment, the doping agent may be phosphorous.

By doping the SiGe/Si support structure 500, it becomes electrically conductive, which in turn allows thermistor 214 to be current biased. In a preferred embodiment, the SiGe/Si layers 502 and 504 strongly suppress acoustic phonon transport (heat) by a combination of Brillouin zone interfacial scattering and the creation of gaps in the phonon spectra, resulting in thermal conductivity in the 1 W/m-K range.

Figure 6A:
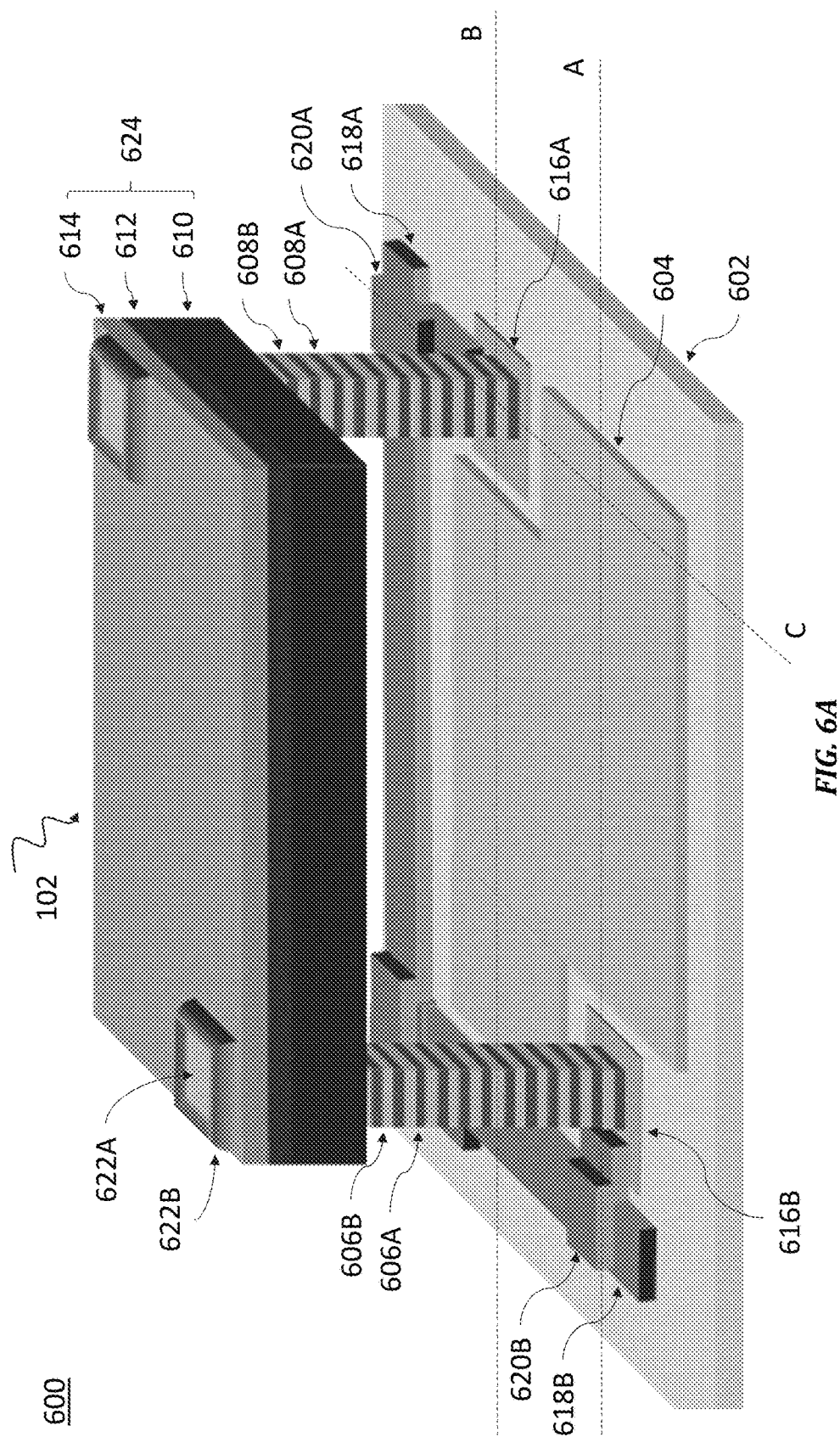
FIG. 6A is a perspective view of a bolometer according to one embodiment.
Figure 6B:
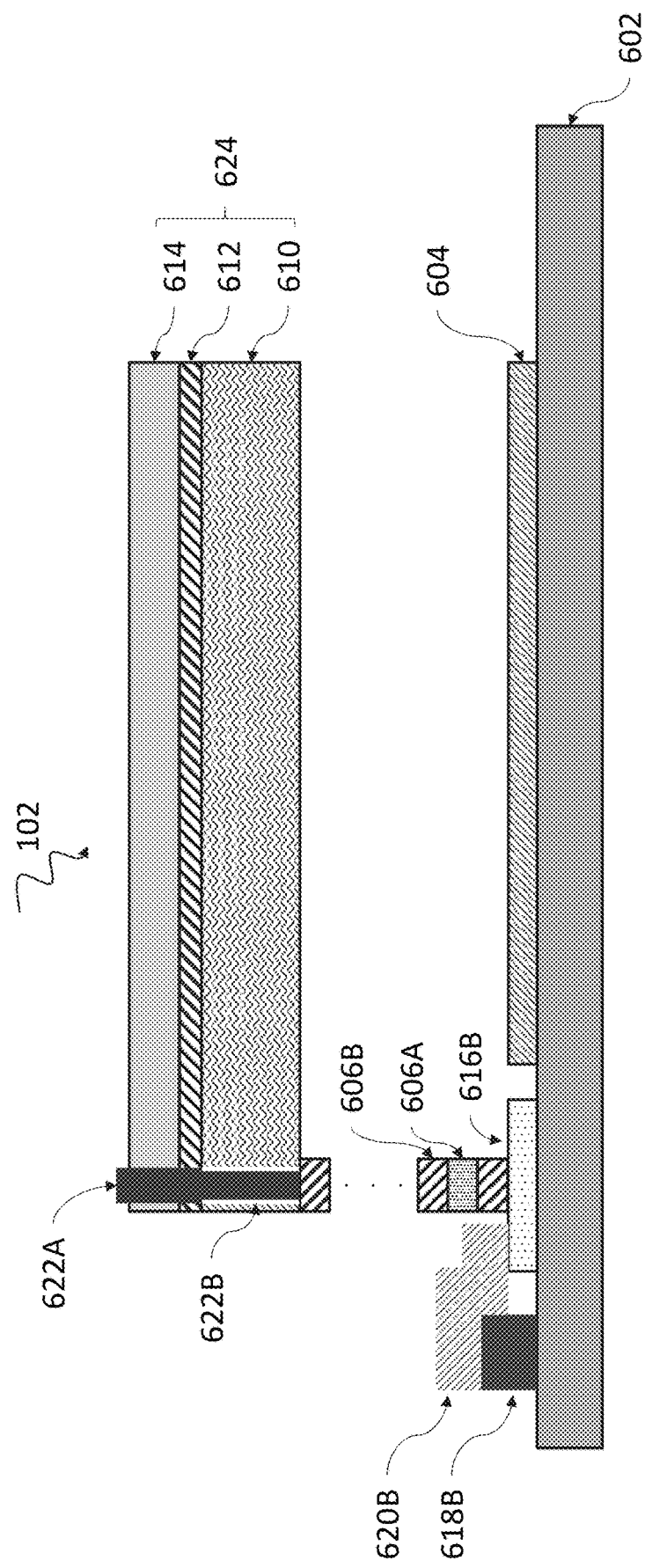
FIG. 6B is a cross-sectional view of the bolometer showing in FIG. 6A.
Figure 6C:
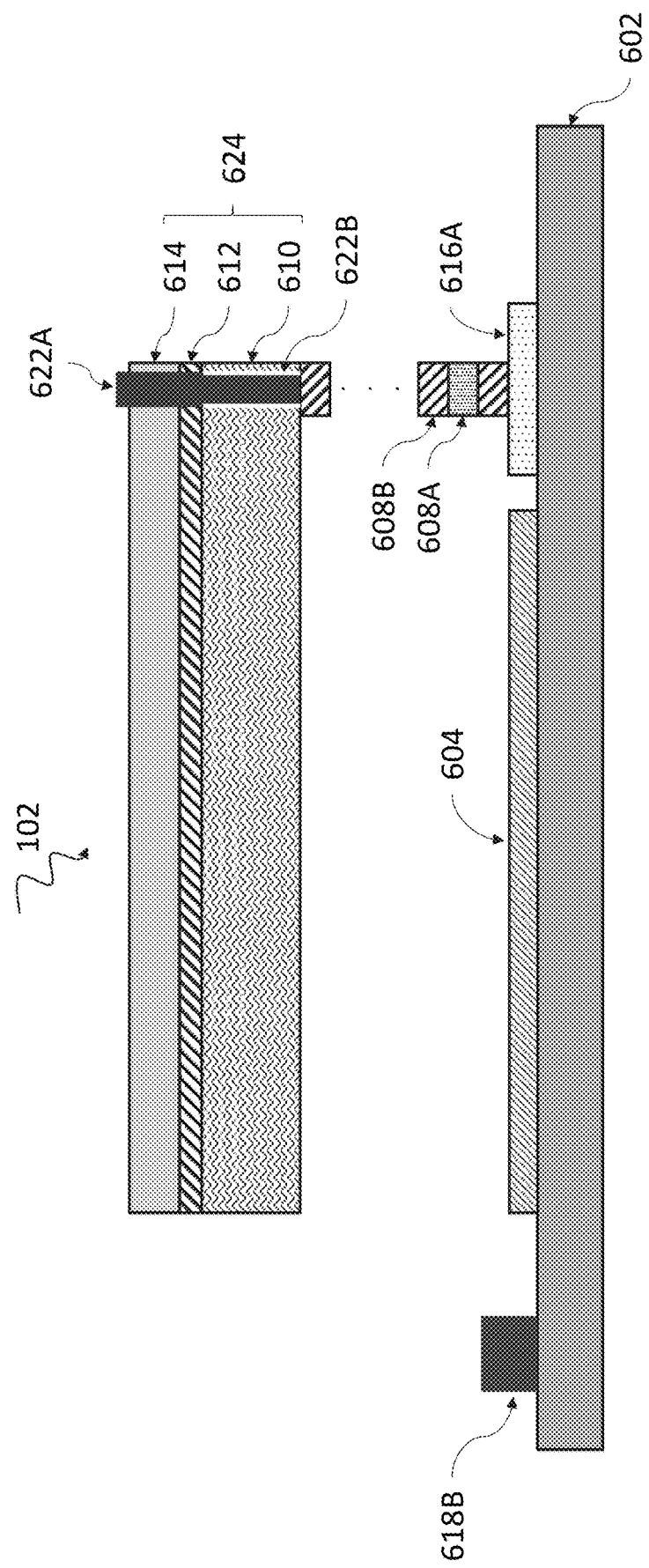
FIG. 6C is another cross-sectional view of the bolometer showing in FIG. 6A.
Figure 6D:
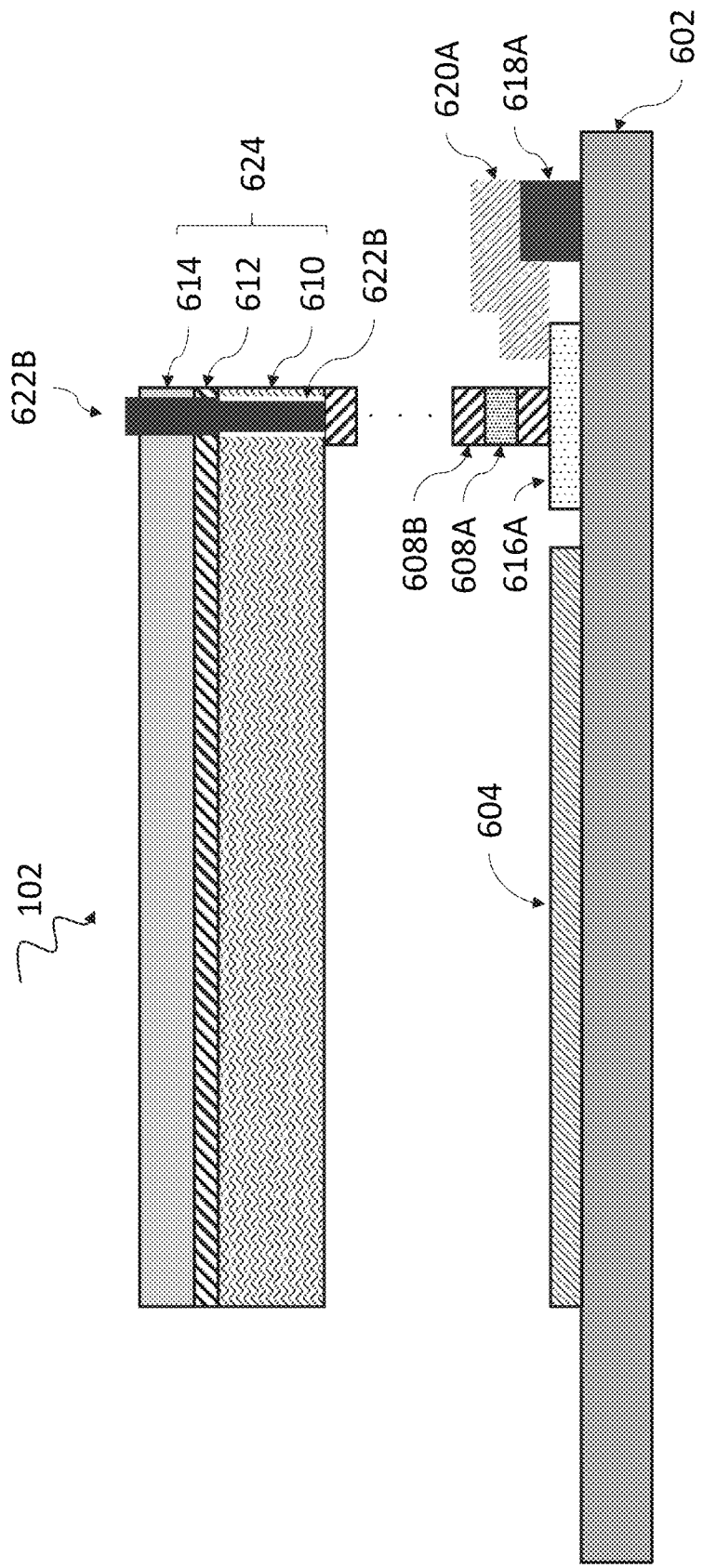
FIG. 6D is yet another cross-sectional view of the bolometer showing in FIG. 6A.

FIGS. 6A-6D are illustrations of an exemplary bolometer 600. FIG. 6A is a perspective view of bolometer 600. FIG. 6B is a cross-sectional view of bolometer 600 taken along line A in FIG. 6A. FIG. 6C is another cross-sectional view of bolometer 600 taken along line B in FIG. 6A. FIG. 6D is yet another cross-sectional view of bolometer 600 taken along line C in FIG. 6A.

In FIGS. 6A-D, a mirror 604 is disposed on a substrate 602. In a preferred embodiment, substrate 602 comprises silicon and a ROIC (not shown). Like with the bolometers described above, mirror 604 is a metal, preferably titanium/palladium with thicknesses of 100 Å and 1500 Å respectively. Of course, a person of ordinary skill in the art would recognize that other metals could be used, including, for example copper, silver or gold. In addition, the thicknesses of the titanium and palladium components could be adjusted within respective ranges without losing effectiveness. For example, the titanium component may be 50-300 Å and the palladium component may be 850-2500 Å. Mirror 604 is disposed underneath a bolometer bridge 624 comprised of an RGO absorber 610, an isolation layer 612, and a PRGO thermistor 614 formed by the techniques described above.

In FIGS. 6A-D, support structures 606 and 608 are disposed on contact pads 616B and 616A, respectively. Pads 616A and 616B provide an electrical connection between the support structures 606 and 608 and the ROIC (not shown). As noted above, the support structures 606 and 608 are electrically conductive and thus allow the thermistor 614 to be driven under the control of the ROIC. In FIGS. 6A-D, pads 616A and 616B are respectively connected to buses 618A and 618B by connectors 620A and 620B to complete the electrical circuit between thermistor 214 and the ROIC.

As discussed above in reference to FIG. 5, the supports structures are formed by an alternating arrangement of SiGe layers 606A and Si layers 606B. Since the support structures 606 and 608 function to thermally isolate the bolometer bridge 624 from the substrate 602 while providing an electrical pathway, either the SiGe layers 606A and 608A or the Si layers 606B and 608B could be in contact with pads 616A and 616B, respectively. Disposed on top of the support structures 606 and 608 is an RGO absorber 610 formed by the techniques described above. Like RGO absorber 210, RGO absorber 610 is preferably 50 nm thick. Disposed on RGO absorber 610 is an isolation layer 612. Like isolation layer 212, isolation layer 612 preferably comprises Al$_2$O$_3$ formed by atomic layer deposition and is 10 nm thick. Thermistor 614 is disposed on the isolation layer 212 by the techniques described above. Like thermistor 214, thermistor 614 comprises partially reduced graphene oxide. Having described the components shown in FIGS. 6A-D, attention will now be turned to one technique for forming bolometer 600 in reference to FIGS. 7A-7D.

Figure 7A:
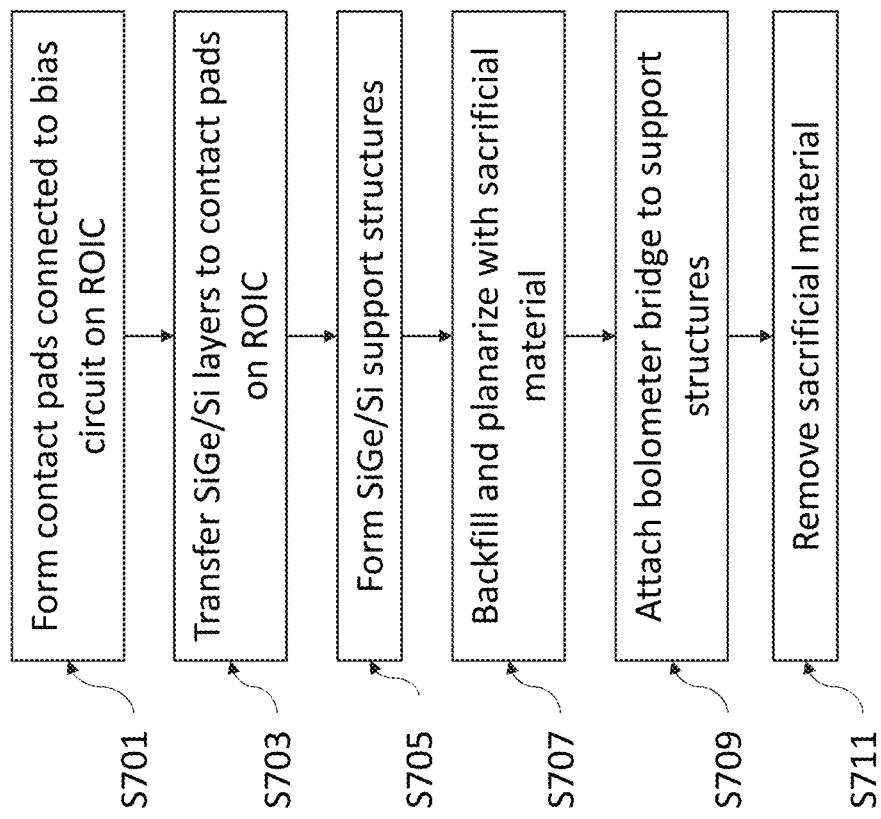
FIG. 7A is a flow chart illustrating the steps of forming bolometers.
Figure 7B:
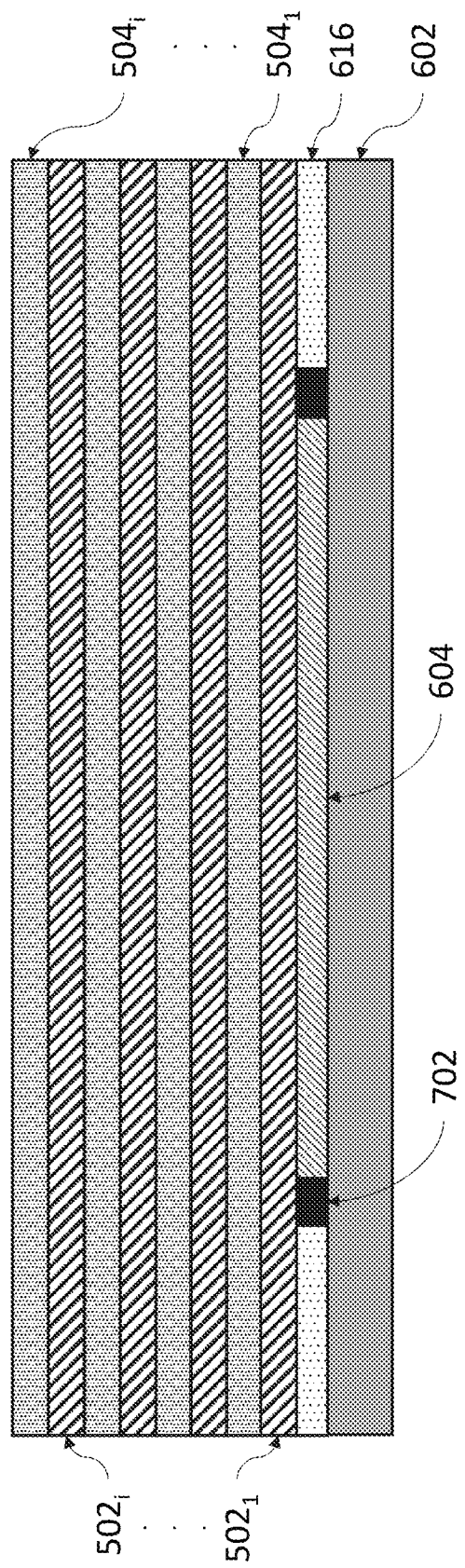
FIG. 7B is a cross-sectional view of a bolometer, according to one embodiment, at one stage of development.
Figure 7C:
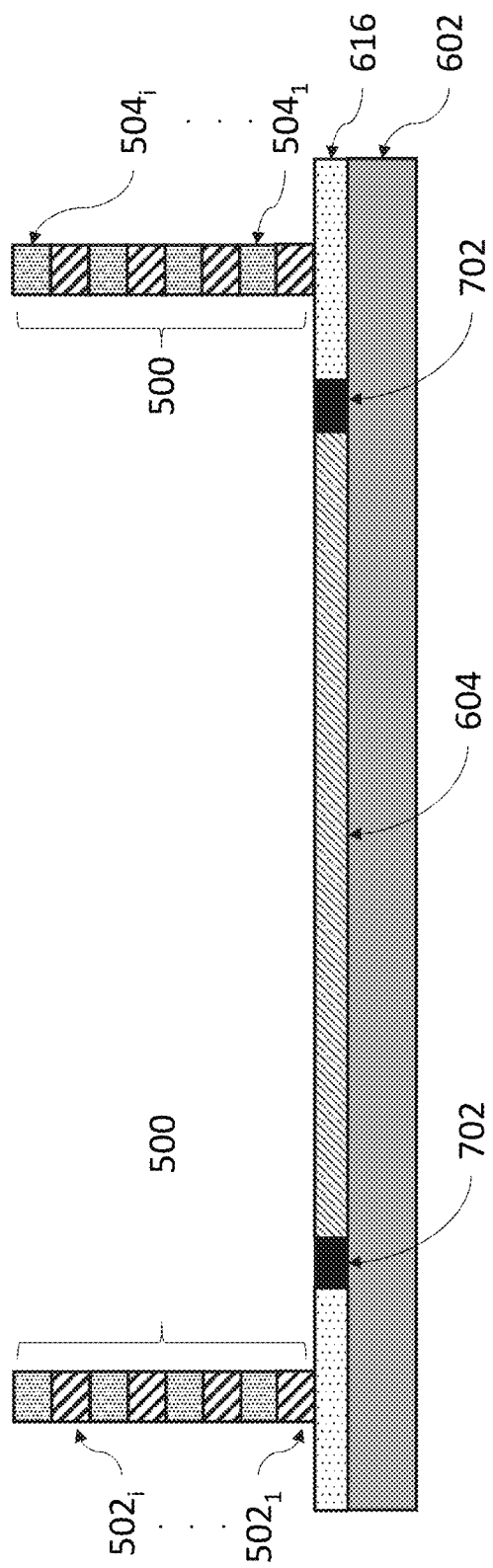
FIG. 7C is a cross-sectional view of a bolometer, according to one embodiment, at another stage of development.
Figure 7D:
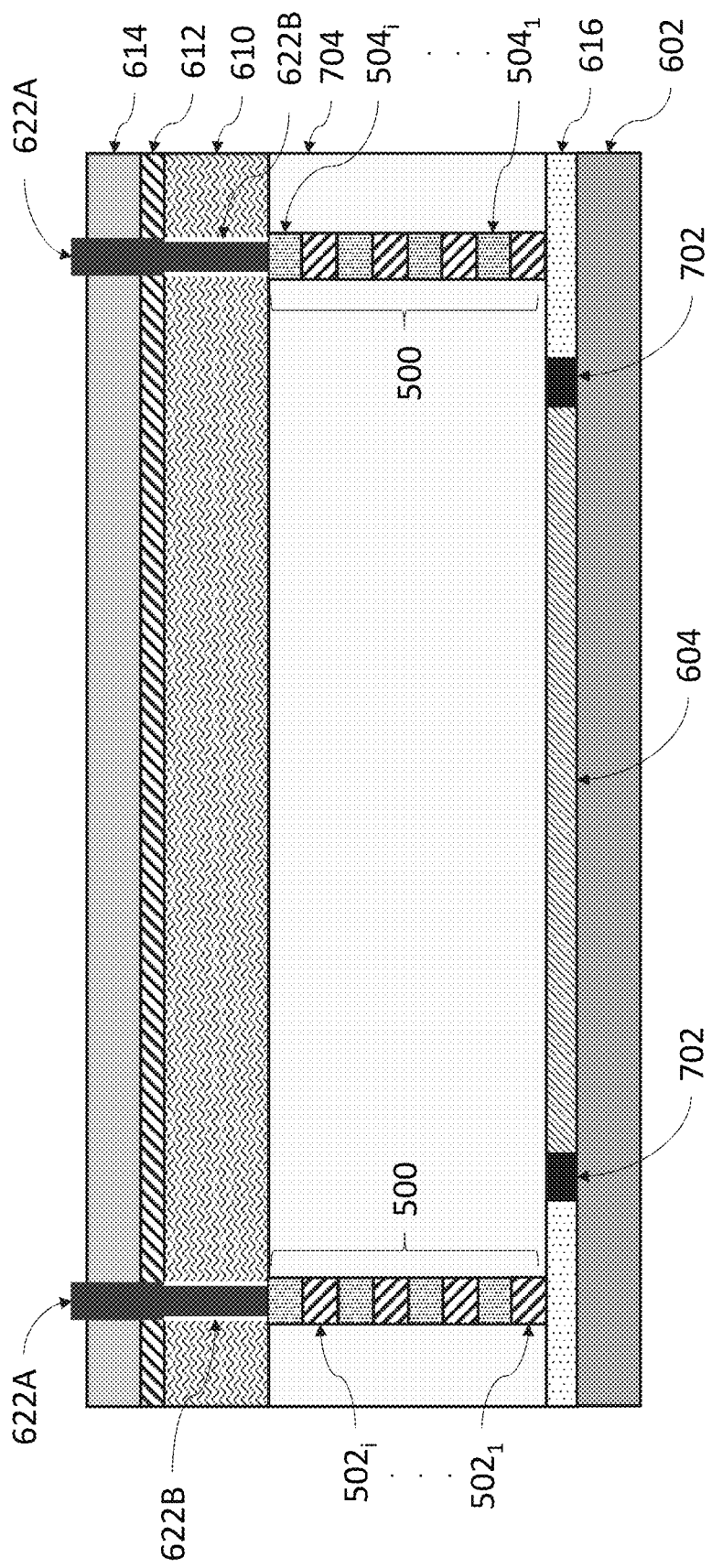
FIG. 7D is a cross-sectional view of a bolometer, according to one embodiment, at yet another stage of development.
Figure 7E:
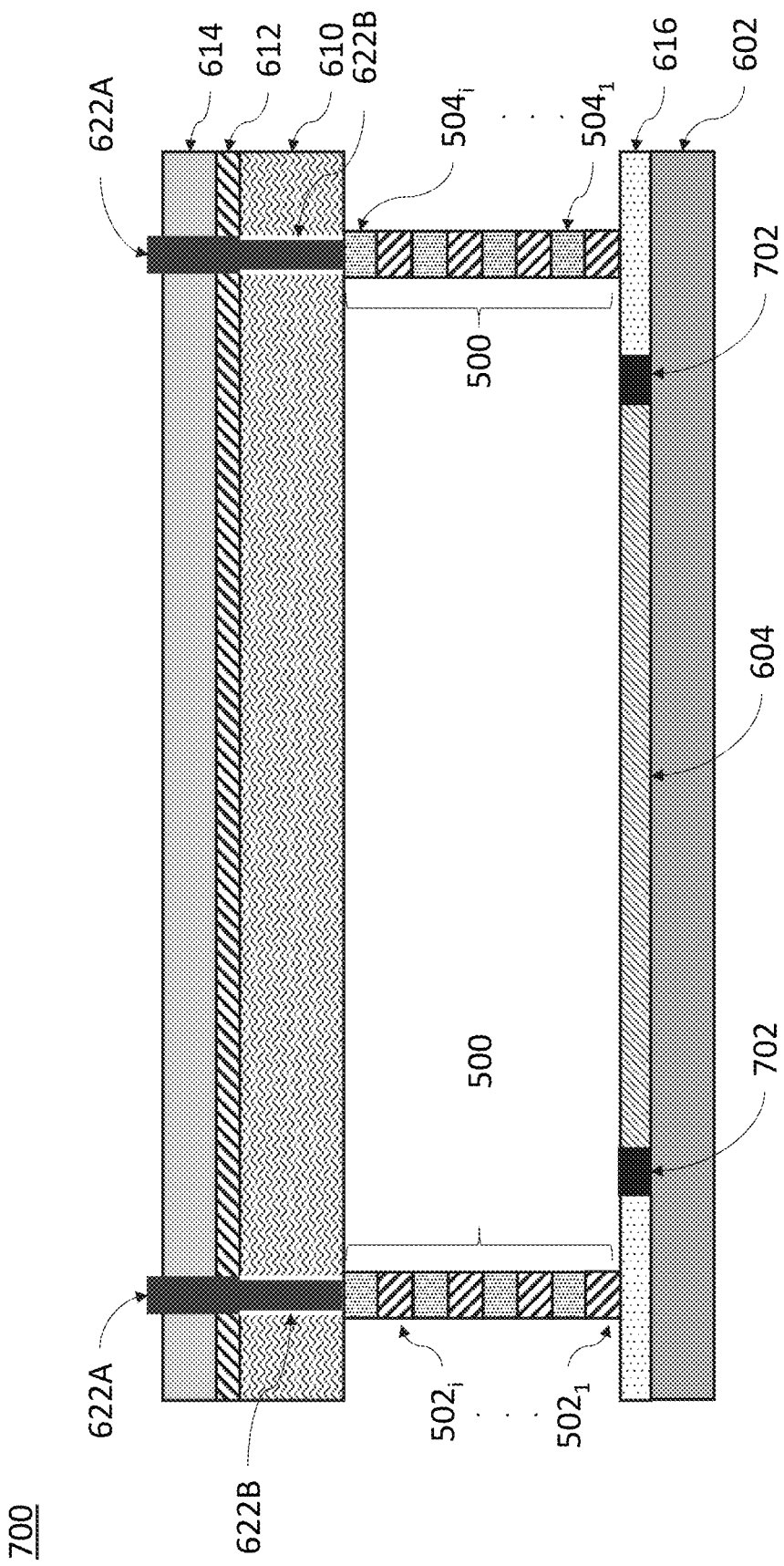
FIG. 7E is a cross-sectional view of a bolometer formed according to the steps outlined in FIG. 7A

FIG. 7A is a flow chart illustrating the steps in a preferred method of forming bolometer 600. First, in S701, a planarized level that includes: mirror 604, contacts pads 616, and an optional electrically isolating spacer 702 are formed on a Si substrate 602 that includes an ROIC (not shown) such that the contact pads 616 are connected to the bias circuit portion of the ROIC. Next, in S703, SiGe and Si layers (produced from the techniques described above) are transferred at a wafer level by wafer-bonding to the Si substrate 202. Optionally, a thin metal film may be applied to one of the SiGe/Si layers that will be in contact with a contact pad 616 to promote wafer bonding. FIG. 7B illustrates the bolometer after step S703. FIG. 7B shows a plurality of first material layers 502$_1$ . . . 502$_i$ and a plurality of second material layers 504$_1$ . . . 504$_i$ are alternately disposed on top of each other. As discussed above, in a preferred embodiment the first material layers 502 may be one of SiGe or Si layers, and the second material layer 504 may be the other. Next, in S705, the first material layers 502 and the second material layers 504 are etched via a highly anisotropic etch technique (e.g., a metal-assisted chemical etching) to form the SiGe/Si support structures 500 (606 and 608 in FIG. 6A). At this time, any metallic wafer adhesion layer is also removed. Next, in S707, the structure is backfilled and planarized with a sacrificial material (e.g., photoresist) leaving the tops of the support structures 500 exposed and flush with the surface of the backfilled material. Next, in S709, the bolometer bridge 624 is attached to the support structures 500.

Figure 7F:
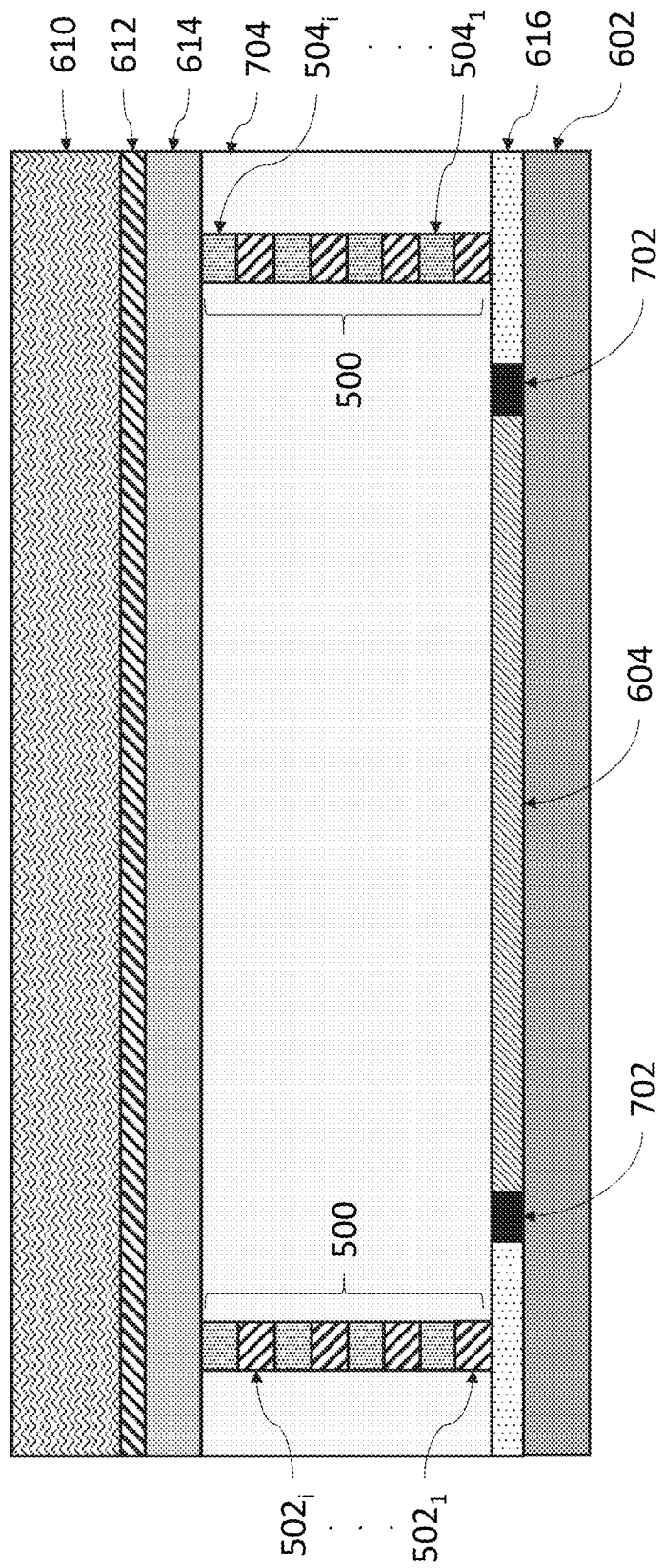
FIG. 7F is a cross-sectional view of another bolometer formed according to another embodiment at one stage of development.
Figure 7G:
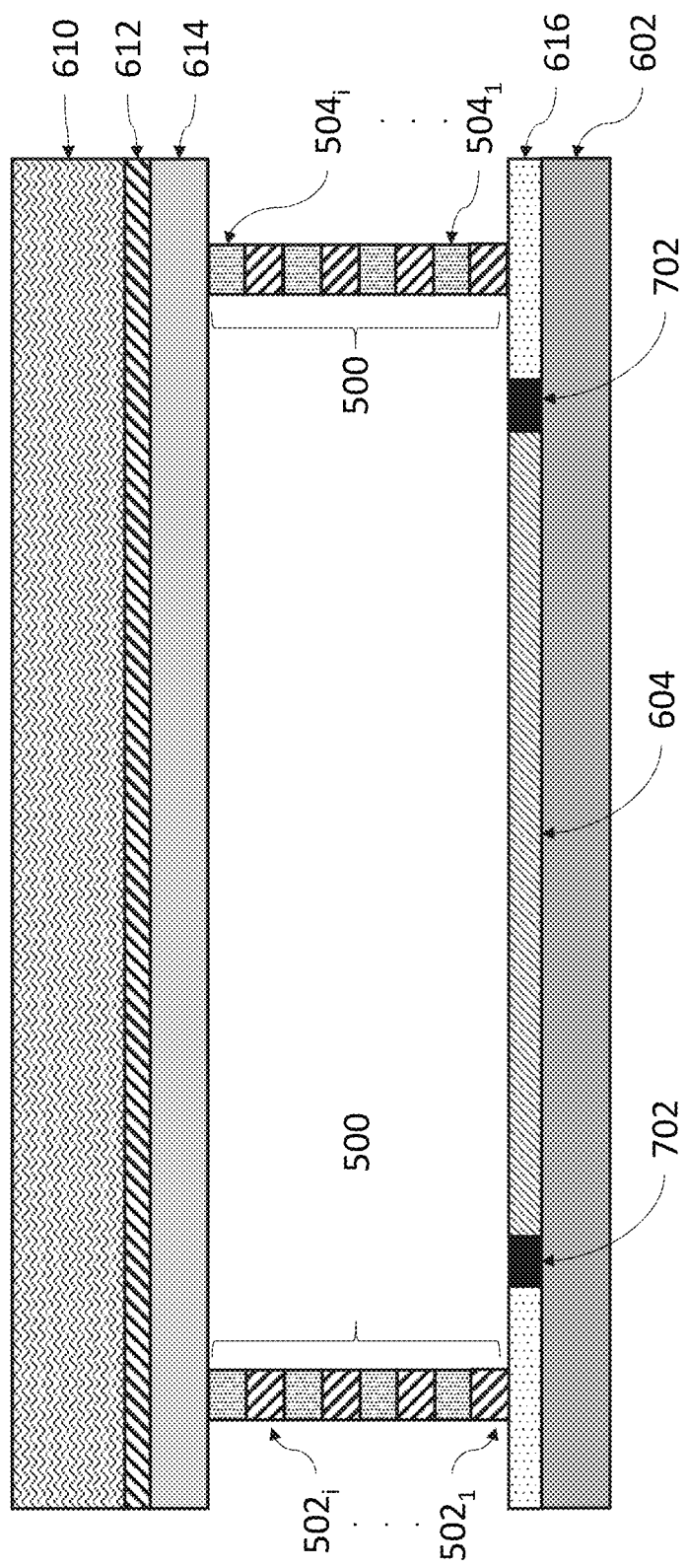
FIG. 7G is a cross-sectional view of the other bolometer formed according to the steps outlined in FIG. 7A.

Bolometer bridge 624 may be attached in at least two configurations. In the first configuration, as illustrated in FIGS. 6A-6D and 7D-E, the bolometer bridge 624 may be attached such that thermistor 614 is on top, i.e., thermistor 614 is the topmost layer distal from the substrate 602. In that case, through holes must be formed in the bolometer bridge 624 and filled with a conductive material 622A to provide an electrical connection between the support structures 500 and the thermistor 614. However, a dielectric material 622B must also be provided in the through holes and surrounding the conductive material 622A in at least in the region of the RGO absorber 210 to prevent electrical connectivity between the RGO absorber 210 and the ROIC. In the second configuration, the bolometer bridge may be attached to the support structures 500 such that the thermistor 614 is in contact the support structures 500 and the sacrificial layer 704, as illustrated in FIGS. 7F and 7G. In this configuration, the conductive material 622A and the dielectric material 622B are unnecessary as the thermistor is in direct contact with the support structures. Next, the bolometer is exposed to a low temperature thermal treatment to ensure that adhesion of the bolometer bridge 624 to the support structures 500. Then, in S711, the sacrificial layer is removed to complete the bolometer 700 (FIG. 7E) or 800 (FIG. 7G).

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A bolometer, comprising:
   a substrate;
   a support structure comprising at least one SiGe layer and at least one Si layer; and
   a bolometer bridge comprising:
      an absorber comprising reduced graphene oxide,
      an isolation layer, and
      a thermistor comprising partially reduced graphene oxide,
   wherein the support structure forms an electrical connection between the thermistor and the substrate, and
   wherein the support structure provides thermal isolation between the bolometer bridge and the substrate.

2. The bolometer according to claim 1, further comprising:
   another support structure comprising at least one SiGe layer and at least one Si layer disposed between the substrate and the bolometer bridge,
   wherein the other support structure forms an electrical connection between the thermistor and the substrate.

3. The bolometer according to claim 2,
   wherein the support structure includes a plurality of SiGe layers and a plurality of Si layers alternately arranged, and
   wherein the other support structures includes another plurality of SiGe layers and another plurality of Si layers alternately arrange.

4. The bolometer according to claim 2, wherein the SiGe layer is an alloy with a composition between $Si_{0.8}Ge_{0.2}$ and $Si_{0.9}Ge_{0.1}$, inclusive.

5. The bolometer according to claim 1, wherein a thickness of the absorber is between 20 and 200 nm, inclusive.

6. The bolometer according to claim 1, wherein a thickness of the thermistor is between 5 and 30 nm, inclusive.

7. The bolometer according to claim 1, wherein the isolation layer is disposed on the absorber, and the thermistor is disposed on the isolation layer.

8. The bolometer according to claim 7,
   wherein the isolation layer comprises a dielectric, and
   wherein a thickness of the isolation layer is between 2 and 20 nm, inclusive.

9. The bolometer according to claim 1, wherein the support structure is doped to an n-doping level in a range of $1.0\times10^{-18}$-$1.0\times10^{-20}$ $cm^{-3}$, inclusive.

10. The bolometer according to claim 1, wherein the thermistor is proximate to the substrate relative to the absorber.

11. The bolometer according to claim 1, wherein the absorber is proximate to the substrate relative to the thermistor.

12. A method of forming a bolometer, comprising:
    forming a plurality of SiGe layers and Si layers on a substrate that includes a mirror, wherein the plurality of SiGe layers and Si layers are alternately arranged;
    etching the plurality of SiGe layers and Si layers to form a plurality of support structures;
    forming a sacrificial layer around the plurality of support structures, wherein a surface of the sacrificial layer and at least one surface of each support structure lie approximately in the same plane;
    providing a bolometer bridge, that includes a thermistor comprising partially reduced graphene oxide, an absorber comprising reduced graphene oxide, and an isolation layer, on the surface of the sacrificial layer and the at least one surfaces of the support structures; and
    removing the sacrificial layer such that the bolometer bridge is supported by the support structures.

13. The method according to claim 12, wherein the plurality of support structures form an electrical connection between the thermistor and the substrate.

14. The method according to claim 12, wherein the plurality of SiGe layers are alloys with a composition between $Si_{0.8}Ge_{0.2}$ and $Si_{0.9}Ge_{0.1}$, inclusive.

15. The method according to claim 12, wherein a thickness of the absorber is 20 to 200 nm, inclusive.

16. The method according to claim 12, wherein a thickness of the thermistor is between 5 and 30 nm, inclusive.

17. The method according to claim 12, wherein the isolation layer is disposed on the absorber, and the thermistor is disposed on the isolation layer.

18. The method according to claim 12, wherein the isolation layer comprises a dielectric, and wherein a thickness of the isolation layer is 2 to 20 nm, inclusive.

19. The method according to claim 12, wherein the bolometer bridge is provided such that the thermistor is proximate to the substrate relative to the absorber.

20. The method according to claim 12, wherein the bolometer bridge is provided such that the thermistor is proximate to the substrate relative to the thermistor.

* * * * *